Sept. 27, 1960
G. J. NELSON
2,953,870
APPARATUS FOR CONTROLLING FROST DAMAGE
TO FRUIT TREES AND VEGETABLES
Filed Aug. 8, 1958
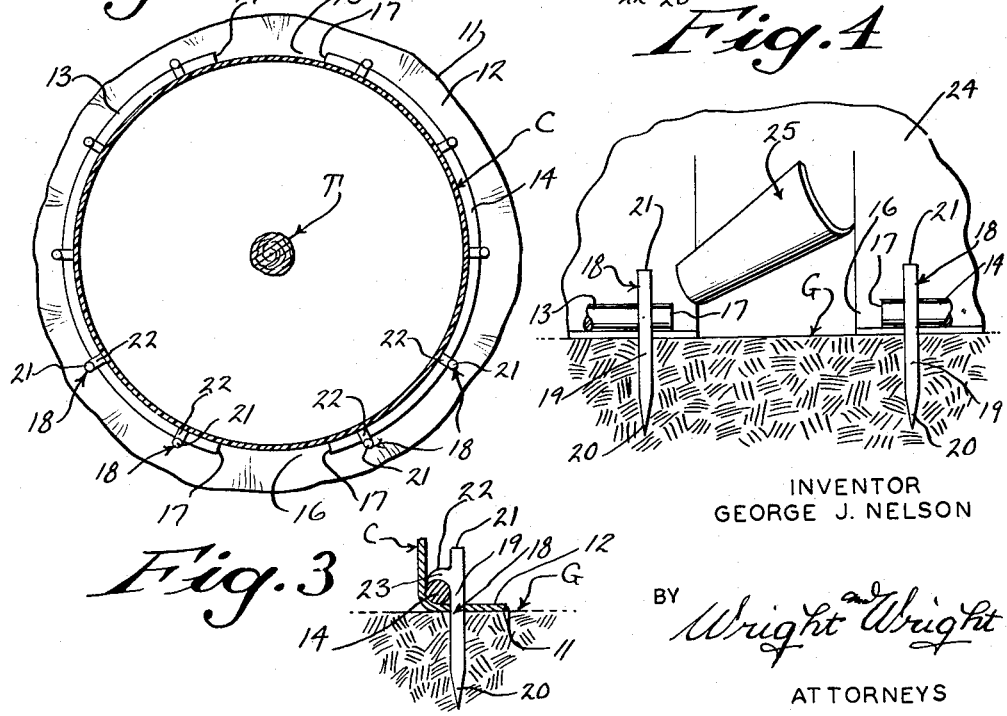
INVENTOR
GEORGE J. NELSON
BY *Wright and Wright*
ATTORNEYS

United States Patent Office 2,953,870
Patented Sept. 27, 1960

2,953,870
APPARATUS FOR CONTROLLING FROST DAMAGE TO FRUIT TREES AND VEGETABLES

George J. Nelson, 1523 S. 26th St., Milwaukee, Wis.

Filed Aug. 8, 1958, Ser. No. 754,039

1 Claim. (Cl. 47—21)

This invention appertains to an apparatus for controlling frost damage to fruit trees and vegetables and, more particularly, to provide a protective cover for the trees and vegetables and this is especially useful in Southern States where an unexpected frost causes untold damage.

Each year the Southern States as well as the Western States, particularly where the climate is predominately warm, suffer loss of crops due to an unexpected frost condition. Some of the time, smudge pots and the like set out in orchards and between rows of vegetables may be sufficient to alleviate this loss. However, every two or three years, a prolonged frost hits the Southern States and extensive damage is caused and the extent of this damage is felt throughout the entire national economy. Not only are the fruits and vegetables themselves affected, but feed for cattle and other livestock is destroyed and thus the livestock must be curtailed or slaughtered immediately at a great loss to the rancher and resulting in higher prices to the consumer later on.

In the past, much thought has been given in attempts to overcome and to cope with these conditions but, unfortunately, all past attempts have proved impractical in that they are either too expensive to properly use and maintain or too complicated to handle or just fail to do the job. For example, there have been many attempts in the past to provide protective covers for fruit trees and also to provide means within these covers for heating the interior to raise the temperature and drive away the frost. However, in every instance of which I am aware, the protective cover hampered circulation of air, kept out the sunlight and, therefore, had to be removed constantly and the bag put on when a frost was expected. There is then a great need for some means and method of heating the air in the vicinity of the fruit trees and vegetables but at the same time allowing proper circulation of the air and also to allow sunlight to enter the interior and thus aid in the proper ripening of the fruit and development of the plant.

A primary object of my present invention, therefore, is to provide a protective cover for first trees or vegetables which raises the temperature of the air around the trees and vegetables and which may, if desired, be left permanently in position about the trees.

An important object of my present invention is to provide a protective cover as above described which will allow proper circulation of air and the admittance of sunlight.

Another object of my present invention is to provide a transparent cover preferably of a polyethylene material provided with apertures therethrough for the circulation of air and which cover will completely surround the tree and area about the trunk of the tree whereby the sun rays may enter the interior of the cover and raise the temperature to the desired degree.

A further object of my invention is to provide novel means for holding the bottom of the cover to the ground about the trunk of a fruit tree or along rows of vegetables or the like, so that the cover will be secure and not be damaged by wind, rain or sleet.

Still another object of my present invention is to provide means whereby access may be had to the interior of the cover without removing the same so that, if desired, an additional heating element may be placed within the interior of the cover.

A salient feature of my invention resides in the fact that not only do I provide a protective cover for fruit trees, and the like, and means for raising the temperature to alleviate frost, but I allow sunlight to enter the interior of the cover so that its beneficial results upon the fruit and the tree may be had without the necessity of removing the cover.

A further object of my invention is that the cover may be quickly and easily placed about the trees and secured to the ground by utilizing semi-circular rods and especially designed hook pegs.

A still further object of my invention is to provide a simple, practical and reliable construction that is economical to manufacture, easy to assemble and positive in its operation.

With the above and other objects in view which will more readily appear as the nature of the invention is better understood, the same consists in the novel construction, combination and arrangement of parts hereinafter more fully described, illustrated and claimed.

A preferred and practical embodiment of my invention is shown in the accompanying drawing, in which:

Figure 1 is a side elevational view partly in section illustrating my transparent cover secured in place about a fruit tree;

Figure 2 is a horizontal sectional view through the cover taken on the line 2—2 of Figure 1 of the drawing and looking in the direction of the arrows;

Figure 3 is a detailed view, partly in section, illustrating my novel means for retaining the bottom of the cover in close proximity to the ground, and Figure 4 is a fragmentary front elevational view of the covering illustrating a front flap which may be provided so that access may be readily had to the interior of the cover.

Referring now to the drawings in detail wherein similar reference characters designate corresponding parts throughout the several views, the letter C generally indicates one form of my improved cover utilized in my novel method and apparatus for frost control of fruit trees and vegetables.

As previously stated, the extensive damage to fruit and vegetables due to frost is a problem that has confronted, more particularly, the Southern States for years and to my knowledge, no practical solution to this problem has been found. However, I have found that by utilizing polyethylene material of approximately a .003 thickness and forming a large bag or cover of sufficient area to completely envelop the entire tree T and then providing this bag with a series of perforations or vents 10 and properly securing the cover about the tree, the problem of alleviating frost is solved in a most practical manner. I have also found from experience, that the .003 thickness of material is critical in that, from experimentation, it has been ascertained that just the proper amount of sunlight passes through the material so as to heat the interior of the bag and also to have its beneficial result on the growth of the tree and maturing of the fruit.

The bag C may be placed over the tree in any desired manner but preferably, it could be done by using a boom truck (not shown) and in any event, the bag should be large enough so that its open outer periphery 11, which when in place becomes the bottom of the bag, can be spread out to lie adjacent to the ground G as shown in Figures 1, 3 and 4 of the drawing. In order to firmly secure the bag to the ground, the outer periphery 11 is spread out as previously stated, forming a circular lip 12 and I provide two light semi-circular rods 13 and 14, respectively, and these rods are laid upon the lip 12 in spaced relation, one to the other, as shown more clearly in the top plan view of Figure 2 of the drawing so that spaces 15 and 16 are provided between the ends 17 of each rod 13 and 14. This is primarily done so that access may be had to the interior of the bag.

In order to secure the rods 13 and 14 firmly in the ground and about the bag, I provide a series of novelly constructed pegs 18 and each peg or pin 18 includes an elongated body portion 19, a sharpened pointed end 20 and a flat head portion 21. On one side and adjacent the head portion 21, I provide a curved downwardly extending bill 22 forming a hook 23 to engage the round portion of the rods 13 and 14 respectively. These pins 18 may be utilized in any desired manner, as required to firmly secure the lip 12 of the bag C to the ground G.

The body 24 of the bag C may be made in any desired shape but preferably, as shown, is circular as this is generally the shape of fruit trees and the like but it is obvious that the bag may be made elongated, square, rectangular or for that matter, in any desired shape and may be made of a single piece of polyethylene joined together or may be made in segments (not shown) sealed and joined together. The important feature, however, is that the bag be transparent but approximately .003 inch thick and be provided with the necessary air vents.

When the bag is in place, as shown in Figure 1 of the drawing, the sun rays passing into the interior of the bag will serve to raise the temperature of the interior sufficiently for most purposes and the interior heat will be retained through most of the night and if a frost condition should arise, the trees will not be damaged.

However, if desired, any well-known type of heating unit, such as a smudge pot or any type of electrical heating unit can be inserted in the bag and thus heat the interior air. The smoke, etc. from a smudge pot will easily escape through the air vent 10. As previously stated, this heating unit may be inserted in the space 15 provided between the rods 13 and 14, primarily by lifting the bag and inserting the heater. If desired, however, I may provide a flap 25 (note Figure 4 of the drawing) in the body 24 of the bag adjacent the lower periphery 11 thereof and this flap 25 can be opened and the heating unit (not shown) inserted therein.

The use of transparent polyethylene plastic bags or covers for frost control has these additional advantages over any other known cover. The bag itself is very light and durable and can be used over and over again in that it also can be easily repaired. Further, due to its lightness, the weight of the bag is easily supported by the branches of the trees and/or vegetable plants.

Other salient features of the use of my novel method and light plastic polyethylene bags or covers reside in the fact that weather and moisture conditions will not affect its composition and it can stand low temperatures and will not change its physical characteristics in either extreme hot or extreme cold. Chemical sprays and insecticides will not harm its physical characteristics so chemical spraying can be accomplished under the cover of the polyethylene bag thereby preventing loss of chemicals, washing out due to rain and insuring better control of disease and infection damage. The bag itself is quite elastic and thus can absorb and ward off harm and damage that may result from heavy hail storms and the like.

From the foregoing, it can be seen that I have provided a very simple and practical arrangement as well as a novel method of preventing frost damage to fruits and vegetables which system is relatively inexpensive and extremely practical in use and it is believed that the features and advantages of my invention will be readily apparent to those skilled in the art and it will, of course, be understood that changes in the form, proportion and minor details of construction may be resorted to without departing from the spirit of the invention or the scope of the appended claim.

What I claim as new is:

An apparatus for protecting plants and fruit trees from damage due to frost and hail storms comprising, a transparent plastic bag of a size and configuration to completely cover the plant and tree, said bag being provided with vent openings, means for securing the lower periphery of said bag to the ground, including a pair of identically formed semi-circular rods engaging the lower periphery of the bag laid in face to face relation adjacent the ground, and pegs in the ground having inturned hooks adjacent the upper ends thereof engaging over said rods, said semi-circular rods being spaced one from the other adjacent one mating end and each peg being spaced one from the other to provide an unsecured portion in the lower periphery of the bag giving free access at the interior thereof.

References Cited in the file of this patent

UNITED STATES PATENTS

| | | |
|---|---|---|
| 1,155,313 | Hogan | Sept. 28, 1915 |
| 2,167,219 | Sankey | July 25, 1939 |

OTHER REFERENCES

Publication: Modern Plastics (Magazine) published September 1956, volume 34, No. 1, pages 112 through 116 and pages 233, 234, 236, 238, article "Film on the Farm."